UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

IMPREGNATED COIL AND METHOD OF MAKING THE SAME.

1,213,726.     Specification of Letters Patent.     Patented Jan. 23, 1917.

No Drawing.     Application filed December 4, 1907. Serial No. 405,022.

*To all whom it may concern:*

Be it known that I, LEO H. BAEKELAND, a citizen of the United States, residing at Yonkers, in the county of Westchester and State of New York, have invented certain new and useful Improvements in Impregnated Coils and Methods of Making the Same, of which the following is a specification.

The object of this invention is the provision of an electrical conductor in the form of a coil or equivalent structure, whereof the windings are embedded in and supported by an infusible and insoluble organic body.

According to the invention I produce throughout the mass of the coils or windings of dynamos, motors, transformers and other electrical devices, a synthetic condensation product of phenols and formaldehyde, this condensation product serving not only as an insulator for the windings but as an efficient and durable support therefor. Owing to the infusibility of the supporting mass, such coils are enabled to endure, without injury, a far greater degree of overload than is the case where fusible or resinous products are used; and owing to the insolubility of the mass, it may be directly immersed in oil, and may be used under conditions involving exposure to water or steam, to acid or alkaline liquids, or to organic or inorganic solvents, without injury.

For a full understanding of my invention I will describe a preferred method of carrying the same into effect.

Phenol or its homologues is mixed with formaldehyde in approximately equal molecular proportions, with or without the addition of small proportions of catalytic or condensing agents, and the mixture is heated, preferably in a vessel provided with a return condenser. After some time, depending upon the temperature and the proportion of condensing agents used, the mixture separates into two layers, the one aqueous and the other oily or viscous; the latter represents the first reaction products and is hereinafter referred to as the "initial condensation product." This initial condensation product is soluble in alcohol, acetone, phenol and other solvents, but is only imperfectly and partially soluble in benzol. If sufficiently cooled it may become pasty or stiff, and sometimes brittle, but is readily liquefied by application of heat, and in its fluid and mobile condition possesses excellent penetrative powers, and readily penetrates not only the coil-interstices, but also the fibrous coating of the coils, if such be used. If subjected to sufficiently prolonged heating under proper conditions it is finally transformed into a hard condensation product, which is insoluble in alcohol, acetone, phenol or glycerin, and remains hard at temperatures below 300° C.; at higher temperatures it does not fuse, although some carbonization may occur. This material is a solid, homogeneous, impervious, infusible, and insoluble body which possesses excellent insulating properties and is hereinafter referred to as the "final condensation product." This final condensation product presents many advantages as compared with hard rubber, and other insulators as heretofore used. In particular, it may be mentioned that it is capable of withstanding temperatures at which hard rubber would be entirely destroyed, so that coils impregnated therewith can withstand a very heavy overload without injury. Furthermore, it does not fuse at any temperature, although as above stated, carbonization may take place when it is excessively heated. It possesses the important advantage, as compared with hard rubber, that it is free from sulfur, which is well known to exert a strong corrosive action upon copper, particularly at temperatures considerably above normal, and is also known to give rise under the oxidizing effects of air and light to disturbing traces of sulfuric acid.

The initial condensation product prepared as described above may contain some free water or other volatile constituents, and it is advisable to expel these by heat before transforming it into the final condensation product. Such heating should preferably be effected under reduced pressure and at low temperatures in order to avoid premature conversion with loss of mobility. The liquid condensation product is then applied to the coil in such manner as completely to impregnate the same, the impregnation being assisted, if necessary, by the application of increased pressure, or of vacuum. For the purpose of such impregnation, the initial condensation product may be used alone or in admixture with other substances such as asbestos, insulating fillings and the like; or it may be applied in mixture with materials adapted to facilitate the coating or the subsequent hardening operation or to insure proper flexibility of the final coating. If desired the conductors may be previously coated with cotton, silk, asbestos, insulating varnishes or the like, which are then coated or impregnated with the initial condensation product. The coated conductor, coil or other construction is then subjected to a hardening operation to transform the initial condensation product into a final infusible and insoluble condensation product having the properties above described. Although in the case of thin insulating layers this may be accomplished by simple heating especially if the temperatures do not exceed 100° C., this is a slow and very uncertain process. In order to hasten the transformation but more especially so as to obtain a product of maximum hardness and best qualities it is desirable to apply heat at temperatures considerably above 100° C., and in this case the hardening operation should be conducted under increased pressure; for otherwise the heating may expel volatile constituents or liberate gaseous decomposition products throughout the body of the material and in such an irregular way as to destroy its homogeneity, rendering it porous or cellular in character, and greatly impairing its value as an insulator. In certain cases as when the coil or other construction is closed or is covered by an external layer or envelop, or casing, the internal pressure developed by the volatile constituents liberated under the action of heat, may be sufficient to prevent foaming and to insure homogeneous hardening, but it is usually desirable or necessary to maintain during the heating or hardening process, an appropriate external pressure, as for instance by conducting the hardening operation in hermetically closed chambers, or envelops, heat being applied in any suitable manner and the temperature being maintained preferably between 120° and 200° C. The pressure may be applied by means of compressed air or by a compressed inert gas; in the latter case superficial oxidation of the coating is avoided. As an alternative method the coating may be hardened while immersed in an inert liquid maintained under pressure; the liquid hydrocarbons or mineral oils being particularly suited for this purpose. In this and in all other cases the hardening may be conveniently effected by passing through the conductor an electric current sufficient to heat the coating to the desired temperature and for a sufficient period of time. This hardening may be regarded, from a chemical point of view, as an effect due to the polymerization of the initial condensation product, the material acquiring by and during the act of polymerization the qualities of infusibility and insolubility.

I am aware that it has been proposed to employ for insulating purposes a plastic body made by boiling together phenol and formalhehyde with forty to eighty per cent. of sulfuric acid having a concentration of 16° to 17° Bé., and I do not claim such process, which is entirely inapplicable to the impregnation of coils. In the first place, a product thus prepared persistently retains free acid, which would render it inapplicable for my purposes, and in the second place, a plastic body of the character described cannot be used under any conditions for purposes of impregnation. According to the present process there is first produced a liquid or readily-liquefiable, mobile condensation product which is applied to the impregnation of coils; and this mobile product is thereafter submitted to heat under such conditions as will result in its transformation, *in situ*, by a process of polymerization, into a solid, compact homogeneous and highly inert support for the windings.

The term phenol employed in the claims is to be understood as including the homologues of phenol, such as cresol, and the term formaldehyde is to be understood as including the polymers and equivalents of formaldehyde.

An organic insulating composition adapted for coil impregnation is claimed in my divisional application Serial No. 879,946, filed December 31, 1914.

I claim:

1. The method of making coils for electrical uses, which consists in forming a coil having its windings in spaced relation, filling the interstices between the windings with a fluid and mobile phenolic condensation product, and then transforming said product, *in situ*, into a solid, homogeneous, impervious, insoluble, and infusible body, serving both as a support and as an insulator for said windings.

2. The method of making coils for electrical uses, which consists in forming a coil having its windings in spaced relation, filling the interstices between the windings with a fluid and mobile phenolic condensation product combined with a substance capable of increasing the flexibility of the final product, and then transforming said product, *in situ*, into a solid, homogeneous, impervious, insoluble, and infusible body, serving both as a support and as an insulator for said windings.

3. The method of making coils for electrical uses, which consists in forming a coil having its windings in spaced relation, said windings provided with a fibrous covering, filling the interstices between said windings and simultaneously impregnating said fibrous covering with a fluid and mobile phenolic condensation product, and then transforming said product, *in situ*, into a solid, homogeneous, impervious, insoluble, and infusible body, serving both as a support and as an insulator for said windings.

4. The method of making coils for electrical uses, which consists in forming a coil having its windings in spaced relation, said windings provided with a fibrous covering, filling the interstices between said windings and simultaneously impregnating said fibrous covering with a fluid and mobile phenolic condensation product combined with a substance capable of increasing the flexibility of the final product, and then transforming said product, *in situ*, into a solid, homogeneous, impervious, insoluble and infusible body, serving both as a support and as an insulator for said windings.

5. As a new article of manufacture, a coil for electrical uses whereof the windings are both separated and insulated by a solid, homogeneous, impervious, insoluble, and infusible phenolic condensation product, said condensation product serving both as a support and as an insulator for the coil windings.

6. As a new article of manufacture, a coil for electrical uses whereof the windings are both supported and insulated by a solid, homogeneous, impervious, insoluble, and infusible phenolic condensation product, combined with a substance capable of increasing its flexibility, said condensation product serving both as a support and as an insulator for the coil windings.

7. As a new article of manufacture, a coil for electrical uses whereof the windings are both separated and insulated by a solid, homogeneous, impervious, insoluble, and infusible phenolic condensation product, substantially free from water or volatile constituents, or acid-reacting components, said condensation product serving both as a support and as an insulator for the coil windings.

8. As a new article of manufacture, a coil for electrical uses whereof the windings are both separated and insulated by a solid, homogeneous, impervious, insoluble, and infusible phenolic condensation product, substantially free from water or volatile constituents, or acid-reacting components, but combined with a substance capable of increasing its flexibility, said condensation product serving both as a support and as an insulator for the coil windings.

9. As a new article of manufacture, a coil for electrical uses whereof the windings are provided with a fibrous covering, and are both separated and insulated by a solid, homogeneous, impervious, insoluble, and infusible phenolic condensation product, said condensation product serving both as a support and as an insulator for the coil windings.

10. As a new article of manufacture, a coil for electrical uses whereof the windings are provided with a fibrous covering, and are both supported and insulated by a solid, homogeneous, impervious, insoluble, and infusible phenolic condensation product, combined with a substance capable of increasing its flexibility, said condensation product serving both as a support and as an insulator for the coil windings.

In testimony whereof, I affix my signature in presence of two witnesses.

LEO H. BAEKELAND.

Witnesses:
H. S. TARBELL,
MARY E. SCHOLDING.